US010225177B2

(12) United States Patent
Li et al.

(10) Patent No.: US 10,225,177 B2
(45) Date of Patent: Mar. 5, 2019

(54) NETWORK PROXY DETECTION

(71) Applicant: SOLARWINDS WORLDWIDE, LLC, Austin, TX (US)

(72) Inventors: Na Li, Austin, TX (US); Lan Li, Austin, TX (US); Chris O'Brien, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 55 days.

(21) Appl. No.: 15/363,660

(22) Filed: Nov. 29, 2016

(65) Prior Publication Data

US 2018/0152375 A1    May 31, 2018

(51) Int. Cl.
*G01R 31/08* (2006.01)
*H04L 12/721* (2013.01)
*H04L 12/26* (2006.01)
*H04L 29/08* (2006.01)

(52) U.S. Cl.
CPC .............. *H04L 45/26* (2013.01); *H04L 43/10* (2013.01); *H04L 43/106* (2013.01); *H04L 45/124* (2013.01); *H04L 67/28* (2013.01)

(58) Field of Classification Search
USPC .... 370/248, 249, 241.1, 252, 282, 381, 392, 370/395.31, 397
See application file for complete search history.

(56) References Cited

U.S. PATENT DOCUMENTS 7,673,032 B1 *   3/2010   Augart ................... H04L 41/12
                                                                709/223

* cited by examiner

*Primary Examiner* — Phuongchau Ba Nguyen
(74) *Attorney, Agent, or Firm* — Squire Patton Boggs (US) LLP

(57) ABSTRACT

A method includes detecting a first path between a user equipment and a first network entity. The method also include detecting a second path between the user equipment and a second network entity, where the first path is longer than the second path. In addition, the method includes determining whether the second network entity is a proxy server located between the user equipment and the first network entity based on an estimated value of the first path and an estimated value of the second path.

17 Claims, 3 Drawing Sheets

NETWORK PROXY DETECTION

BACKGROUND

Field

Various embodiments pertain to communication network systems. In particular, various embodiments relate to the detection of proxy servers and the locations of the proxy servers in communication network systems.

Description of the Related Art

A proxy server is a dedicated computer or a software system running on a computer that acts as an intermediary between an endpoint device, such as a computer, and another device from which a user or client is requesting service at the endpoint device. A proxy server is used to facilitate an indirect network connection between a user and a network service. Proxy servers can be used to improve performance and security of a communication network, as well as to filter and classify requests from a client.

In one particular use, a proxy server may improve the security of the network. The proxy server can also help to accommodate different types of data and a large number of users. From the point of view of the user, it may be unknown whether or not a proxy server is being used to connect the use to a particular service being requested by the user.

When a user is unable to connect to a requested network service, an error may have occurred in any one of the various network entities used to connect the user to the requested network service. In some cases, when a user experiences performance issues, such as high packet loss and/or large latency, relating to a requested network service, the performance issues may be caused by a malfunction or a failure at the proxy server between the user and the endpoint. When a failure occurs, the proxy server prevents the user from connecting to the network server. For the user to be able to gain access to the requested service, the proxy server malfunction or failure may need to be fixed.

SUMMARY

A method, in certain embodiments, may include detecting a first path between a user equipment and a first network entity. The method may also include detecting a second path between the user equipment and a second network entity, wherein the first path is longer than the second path. In addition, the method may include determining whether the second network entity is a proxy server located between the user equipment and the first network entity based on an estimated value of the first path and an estimated value of the second path.

According to certain embodiments, an apparatus may include at least one memory including computer program code, and at least one processor. The at least one memory and the computer program code may be configured, with the at least one processor, to cause the apparatus at least to detect a first path between a user equipment and a first network entity. The at least one memory and the computer program code may also be configured, with the at least one processor, at least to detect a second path between the user equipment and a second network entity, wherein the first path is longer than the second path. In addition, the at least one memory and the computer program code may also be configured, with the at least one processor, at least to determine whether the second network entity is a proxy server located between the user equipment and the first network entity based on an estimated value of the first path and an estimated value of the second path.

An apparatus, in certain embodiments, may include means for detecting a first path between a user equipment and a first network entity. The apparatus may also include means for detecting a second path between the user equipment and a second network entity, wherein the first path is longer than the second path. In addition, the apparatus may include means for determining whether the second network entity is a proxy server located between the user equipment and the first network entity based on an estimated value of the first path and an estimated value of the second path.

According to certain embodiments, a non-transitory computer-readable medium encoding instructions that, when executed in hardware, perform a process. The process may include detecting a first path between a user equipment and a first network entity. The process may also include detecting a second path between the user equipment and a second network entity, wherein the first path is longer than the second path. In addition, the process may include determining whether the second network entity is a proxy server located between the user equipment and the first network entity based on an estimated value of the first path and an estimated value of the second path.

According to certain embodiments, a computer program product encoding instructions for performing a process according to a method including detecting a first path between a user equipment and a first network entity. The method may also include detecting a second path between the user equipment and a second network entity, wherein the first path is longer than the second path. In addition, the method may include determining whether the second network entity is a proxy server located between the user equipment and the first network entity based on an estimated value of the first path and an estimated value of the second path.

BRIEF DESCRIPTION OF THE DRAWINGS

For proper understanding of the invention, reference should be made to the accompanying drawings, wherein.

DETAILED DESCRIPTION

Figure 1:
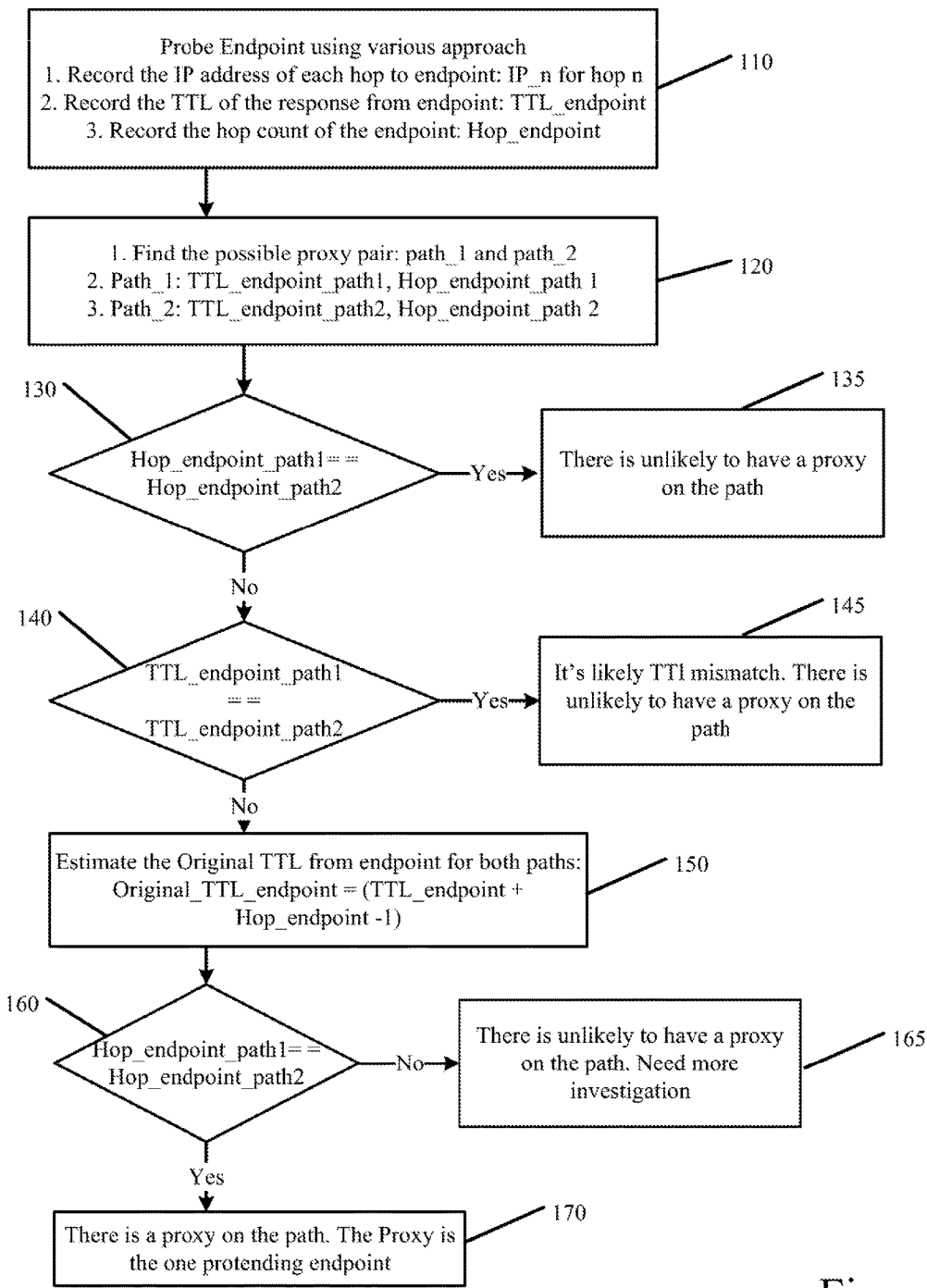
FIG. 1 illustrates a flow diagram according to certain embodiments.

In certain embodiments, it may be helpful to detect that a proxy server is being used to connect a user to a requested network service. Such detection may be helpful in identifying and fixing any errors caused by the proxy server, which prevent the user from being connected to the network service. Detecting the proxy can also help identify and fix various security and performance issues. The embodiments identified below help to achieve significant improvements to the functioning of a network and/or to the functioning of the nodes or computers within the network.

A proxy server may be detected using both path collection and path analysis. In some embodiments, a tracerouting probe may be used in path collection to find different paths between a user and the actual endpoint. The actual endpoint may be the network node providing the requested service. In other embodiments, however, the probe may not reach the intended node providing the requested service, and merely reaches an intermediate or detected endpoint. In such embodiments, the detected endpoint may be an intermediate network entity, which is the last network entity of the path.

Tracerouting is a network diagnostic tool that may be used to record routes through the network. Tracerouting involves the sending of information from each intermediate network node in the network back to the user or to the source node. This signaling can allow the source node to track a routing of a signal through the network to node providing the requested service. The probe may in some embodiment continuously or discretely map, trace, or capture paths through the network. Certain embodiment may utilize multi-path routing to connect the user and the node providing the requested service. Multi-path routing is a routing technique of using multiple alternative paths through a network between two points in the network. The multiple alternative paths in the network can often at least partially overlap, so that the paths share at least one node. Tracerouting can be employed to detect multi-path connections in a network.

As discussed above, in certain embodiments, some traced paths may not reach the node providing the requested service, and may stop at an intermediary node or server between the user and the node providing the requested service. Because only some of the paths will reach the node providing the requested service, the tracerouting probe will produce paths having different lengths. In other embodiments, the different lengths of the paths produced by the tracerouting probe may be caused by the multitude routes a probe may use to reach the endpoint. For example, the actual endpoint of the traced path with the longest length may be, in some embodiments, the node that provides the requested service. On the other hand, the detected endpoint of a traced path that is shorter than the longest path may be an intermediate node, for example, a proxy.

Once the various paths are traced by the probe, an analysis of the path may be undertaken. The analysis may include detecting whether there is a proxy along a given path. If a proxy is detected, the location of the proxy may be determined along the path between the user and the actual endpoint that provides the requested network service.

In certain embodiments, different types of proxies may be detected. For example, one proxy may be a wide-area network (WAN) optimization device. Some proxies may allow for transmission control protocol (TCP) connections to go through and reach the actual endpoint, the actual endpoint in this embodiment being the node providing the requested service. In other embodiments, the proxies may terminate the TCP connection, and responds to a TCP request on behalf of the node providing the requested service. In such embodiments, the detected endpoint of the probe, which may be the last network entity of the path, may be the proxy itself.

In some embodiments, a proxy may never let any TCP connections pass through. For example, a load balancer may be a proxy that offloads hypertext transport protocol secure (HTTPS) terminates HTTPS connections. The load balancer then establishes a hypertext transport protocol (HTTP) connection to a web server, which may be the node providing the requested service. In such an embodiment, the load balancer, which may be the proxy, cannot be detected since it never lets the HTTPS connection reach the node providing the requested service.

Path collection can allow for finding paths that are between the client and the node providing the requested service, as well as paths between the client and the proxy. Any available method or process may be used for path collection. One such method is traceroute probing. Specifically, in certain embodiments, connection-based probing may be used. In connection-based probing, a connection, for example a TCP connection, may be created from the probe to an internet protocol (IP) address of the node providing the requested service. TCP packets with incremental time-to-live (TTL) values may then be sent out within the established connection to find the routers or nodes located along the path of the established connection. In other words, a connection is established between a user and an node providing the requested service, and a probe may be used to determine the router or nodes located in the already establish connection.

A TTL value may be a value in an IP packet header that tells a network router or node whether or not the packet has been in the network for too long, and should be discarded. The TTL value may also be referred to as a hop limit. A hop may be an intermediate server, node, or router located between the probe and the node providing the requested service of the path. TTL may be implemented as a counter or a timestamp attached to or embedded in a data packet.

In certain other embodiments, standard-based probing may be used, either along with or instead of connection-based probing. Standard-based probing may include a sequence of synchronization (SYN) packets, such as TCP SYN packets, that may be sent from a probe with incremental TTL using the same source port. Unlike connection based probing, in standard-based probing the SYN packets may all be within the same connection which has yet be established. Routers or nodes receive the packets from the probe, and decrease the TTL values of the packets. Those packets whose TTL values have reached zero may be discarded, and the router or node at which the packets were discarded may return an ICMP error message to the probe, for example, "ICMP Time Exceeded." In other embodiments, the probe may also receive responses from the routers or nodes in the network indicating a TTL value of a given packet that is greater than zero.

The probe may then match the sent packets with certain TTL values with the responses received from the routers or nodes. Based on this matching, the probe may determine how many hops a router is from the probe. Connecting hops within the same connection can form a path from the probe to the node providing the requested service. In certain embodiments, before the connection is established, a proxy may let probing packets through to reach the node providing the requested service or the actual endpoint. The actual endpoint may be the node or server that provides the user with the requested service. In some embodiments, the path between the probe and the node providing the requested service can be discovered. This path, in certain embodiments, may have the longest length of the traced paths determined by the probe to have followed the same route but reach a different endpoint. For example, a traced path from Texas to Georgia to New York may have a longer length than a path from Texas to Georgia, and as such may be the detected endpoint, which is the last network entity on the path.

In certain embodiments, after a connection, such as a TCP connection, has been established, a proxy may terminate the TCP connection from the probe to the node providing the requested service. The proxy may then respond to requests from the probe as if it were the actual endpoint or the node providing the requested service. This can allow the paths between the probe and the proxy to be discovered. In other words, a proxy may allow packets to pass through and reach the node providing the requested service, thereby tracing the longest possible path in the network. The proxy may then stop allowing packets to pass through, and respond to the probe as if it were the node providing the requested service. In other words, the probe may begin to act as the detected endpoint of the path. This can create shorter paths between the probe and the proxy. The above embodiments may therefore allow for several paths of varying length to be discovered.

The path information may be collected by the probe and analyzed by a designated network entity or the user equipment. In some embodiments, the collecting and analyzing the path information may be done at a network entity, such as a server, node, base station, or router, which is separate from the user equipment or any of the network entities on the traced paths. The user equipment may be a user device, such as a mobile device, personal computer, smart phone, or any other device used by the user. The collected path information may include various data related to the traced paths. For example, the path information may include the IP address at each hop and a TTL value in the IP header of the TCP response whose source IP address is the endpoint IP.

In certain embodiments, when a proxy is used between the probe and the node providing the requested service, the path may end at the proxy in a connection-based probing. In other embodiment, when a proxy is used between the probe and the node providing the requested service, the path may end at the actual endpoint that is providing the requested service in standard-based probing. In embodiments including connection-based probing, once a connection is established, the proxy may have a connection entry, and may respond to the client request on behalf of the node providing the requested service. As such, in connection based probing, the path may end at the proxy, rather than the node providing the requested service. In standard-based probing, no connection may be established. The proxy does not have a connection entry, and lets the probing packets, or the client request, go through. The path in standard-based probing may therefore allow the path to end at the node providing the requested service.

In some embodiments, a path routed by a connection-based probe may end at the node providing the requested service, while in other embodiments the path may end before the node providing the requested service. Both connection-based and standard-based probing may therefore discover some paths that end at the node providing the requested service, and some paths that end at the proxy. The proxy in such embodiments is the last network entity of the path. The length and endpoint of the path may depend on the behavior of the proxy if and when a probe reaches the proxy. Any probing method may be used to determine the traced paths.

Information gleaned from the path collection may then be used in order to analyze whether a proxy has being used, and where the proxy may be located. While the above connection-based and standard-based probing may be used for path collection, any other method may be used to discover and/or probe paths. FIG. 1 illustrates a flow diagram according to certain embodiments. In particular, FIG. 1 illustrates an analysis of the collected path information to determine whether or not a proxy is used in a given path. Step 110 describes a path collection step. In certain embodiments, the IP address for each hop between the probe and the endpoint IP (IP_n) may be recorded. n may represent the number of hops between the probe and the endpoint of a given path. A TTL value included in a response sent from an endpoint (TTL_endpoint) to the probe may also be recorded. In addition, in some embodiments a hop count at the endpoint (Hop_endpoint), representing the total number of hops between the endpoint and the probe may be recorded.

In step 120, a possible proxy pair may be determined. A proxy pair may include two different traced paths, path 1 and path 2, having two different lengths that terminate at a node or a router with the same endpoint IP address. The TTL_endpoint and the Hop_endpoint of path 1 and path 2 may be derived from the collected information. In some embodiments, the two different paths included in the proxy pair must share the intermediate router or node between the probe and the node next to the endpoint. In other words, the two paths included in a proxy pair may share the same path until the last hop.

In other embodiments, the shorter of the two different paths included in the proxy pair must share all of its nodes or routers with the longer path. In other words, the paths may share all the hops from the probe to the node right before the endpoint of the shorter path. For example, path 1 may include [Probe, IP1, IP2, IP3, IP4, IP5, endpoint IP], while path 2 may include [Probe, IP1, IP2, endpoint IP]. IP1, IP2, . . . , IP5 each represent an IP address for a distinct node, router, or hop. Because path 1 and path 2 share all hops until the node right before the endpoint of the shorter path, paths 1 and 2 may be deemed a possible proxy pair. In some embodiments, the proxy endpoint IP address and the IP address of the actual endpoint may be equal.

In another example, path 1 may include [Probe, IP1, IP2, IP3, IP4, IP5, IP6, IP7, endpoint IP], while path 2 may include [Probe, IP1, IP2, IP4, IP5, IP9 endpoint IP]. In this example, paths 1 and 2 are not proxy pairs, because they do not share the same path until the last hop. If IP9 in path 2 were replaced with IP6, then the path 2 and path 1 may then be a proxy pair.

In step 130, a determination may be made about whether the Hop_endpoint of path 1 and the Hop_endpoint of path 2 are equal. If the total number of hops between the endpoint and the probe is equal, it is unlikely that the endpoint of path 2 is a proxy server located in path 1, as shown in step 135. This is because when the total number of hops between the endpoint and the probe in both paths is equal, the paths are of equal length. A path ending with a proxy server, however, will have a shorter length than a path ending in the actual endpoint, because the proxy server may usually be an intermediate network entity. If the Hop_endpoint of path 1 and the Hop_endpoint of path 2 are not equal, however, it may be that the endpoint of the shorter path is a proxy server located in path 1. In such an embodiment, path 1 and path 2 may be labeled as a possible proxy pair.

In step 140, it may be determined whether the TTL_endpoint of path 1 and the TTL_endpoint of path 2 are equal. The TTL_endpoint value may have been collected during the path collection phase, and may have been included in the IP header of the TCP response whose source IP is the endpoint IP. If the TTL_endpoint of path 1 and the TTL_endpoint of path 2 are equal, it may be unlikely that the endpoint of either path 1 or path 2 is a proxy server, as recited in step 145. Rather, when the TTL_endpoint of path 1 and the TTL_endpoint of path 2 are equal it may be more likely that the endpoint of the shorter path is the actual endpoint, and that the response from the endpoint to the probe in the shorter path has been mismatched with a request for a smaller TTL. If the TTL_endpoint of path 1 and the TTL_endpoint of path 2 are different, on the other hand, it may be likely that the endpoint of the shorter path 2 is a proxy server located on the longer of path 1.

In certain embodiments, when the TTL_endpoint of path 1 and the TTL_endpoint of path 2 are equal, and the lengths of path 1 and path 2 are different, the different lengths of the path may be due to an error in path collection. The response from the intermediate node or the endpoint may not contain the number of hops the node or endpoint is located away from the probe. The number of hops may be determined by matching the response received by the probe from the node or endpoint with the request. The request may include the initial TTL value of the request, such as the hop limit of the request. If the response is matched to the wrong request, the wrong number of hops may be determined in the response. This matching error may account for the lengths of paths 1 and 2 being different, while the TTL endpoints of paths 1 and 2 are equal.

The result of step 140 may indicate with reasonable certainty whether the endpoint of the shorter path is a proxy located in the longer path. Reasonable certainty, for example, may be a fifty percent chance that the endpoint of the shorter path is a proxy of the longer path. In other words, there may be a fifty percent chance that the detected endpoint is a proxy of the actual endpoint or the node providing the requested service. In step 150 the initial or original TTL values for path 1 and path 2 may be estimated, and may also be referred to as the Original TTL_endpoint. In certain embodiments, the estimate may be calculated by adding the endpoint hop count Hop_endpoint and the TTL_endpoint for each of paths 1 and 2, and subtracting the added value by one. If the calculated initial or original TTL of both path 1 and path 2 are determined to be possible original TTL, as shown in step 160, the endpoint of the shorter path is a proxy or the detected endpoint, as shown in step 170. If not, in certain embodiments more investigation may be needed in order to determine whether the endpoint of the shorter path is a proxy, as shown in step 165. Possible original TTLs may be included in a list of initial or original TTLs that are used by different operating systems.

In some embodiments, determining whether the calculated initial or original TTL is a possible original TTL, as shown in step 160, may be based at least in part on a default list of possible default original TTL values. The possible default original TTL values may vary depending on the device, operating system, version, and/or protocol used. For example, a device using Linux Red Hat® 9 using an Internet Control Message Protocol (ICMP) and a Transmission Control Protocol (TCP) may have an original TTL value of 64. If the calculated initial or original TTL of the endpoint of the shorter path matches one of the default original TTL values, it may be deemed to be a proxy server of the longer path.

Figure 2:
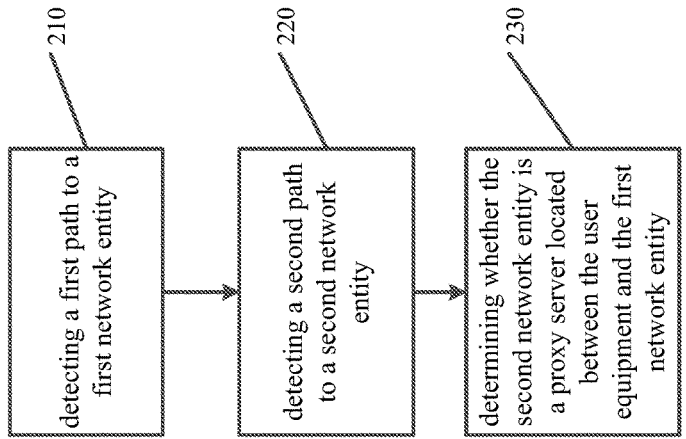
FIG. 2 illustrates a flow diagram according to certain embodiments.

The following is an example of an embodiment of the flow diagram described in FIG. 2. The endpoint IP address may be 10.140.2.16. Path 1 may include [Probe, IP1, IP2, IP3, IP4, IP5, 10.140.2.16] with the endpoint being located at hop 6, and a TTL_endpoint of 123. Path 2, on the other hand, may include [Probe, IP1, IP2, 10.140.2.16] with the endpoint being located at hop 3, and a TTL_endpoint of 62. Because paths 1 and 2 shares the same hops from the probe until right before the endpoint of path 2, the paths can be said to form a possible proxy pair. In addition, in certain embodiments the IP address of the actual endpoint of path 1, being the node providing the requested service, and the endpoint of path 2, being the proxy, is the same.

The TTL of path 1 is different from the TTL of path 2, so it is likely that the endpoint of path 2 is a proxy server located in path 1. The estimated TTL for path 1 may be 123+6−1=128, which is a possible default initial TTL for a device operating at a certain operating system. The estimated TTL for path 2 may 62+3−1=64, which is also a possible default initial TTL for a device operating at a certain operating system. Because both estimated TTLs fall within the possible default initial TTLs, which may be located in a default list, there may be a proxy between the probe and the actual endpoint in path 1. The proxy may be the node or router of IP3, which is the endpoint of path 2, or a node or a router right before IP3.

FIG. 2 illustrates a flow diagram according to a certain embodiment. In step 210, the user device or network entity may detect a first path between a user equipment a first network entity. In step 220, the user device or network entity may detect a second path between the user equipment and a second network entity. The first path may be longer than the second path. In step 230, a determination is made of whether the second network entity is a proxy server located between the user equipment and the first network entity, based on an estimated value of the first path, and an estimated value of the second path.

In certain embodiments, the estimated value of the initial or original TTL in the response from the endpoint of the first path and the second path may be time-to-live values. In other words, the value of the initial or original TTL of the response packet received from the node providing the requested service or the proxy may be estimated. In addition, estimating the value of the initial TTL in the response from the endpoints of the first and the second paths may be calculated by adding the time-to-live value of the first network entity or the second network entity, respectively, and a hop count of the first network entity and the second network entity, respectively. The estimated values may then be subtracted by one. For example, when the probe receives the response packet whose source IP address may be an endpoint, the TTL in the response packet may be 62. The initial or original TTL value in the response packet, when it is first sent out by the endpoint, may then be estimated or derived. Since each hop along the way reduces the TTL value by 1, the original TTL value may be derived by 62+3−1, where 2 may be the number of hops the detected endpoint is away from the probe.

When the estimated value of the first network entity is not a possible default TTL, or the estimated value of the second network entity is not a possible default initial TTL, the second network entity may be deemed not to be a proxy server of the first path. On the other hand, when the estimated value of the first network entity is a possible default initial TTL and the estimated value of the second network entity is a possible default initial TTL, the second network entity may be deemed to be a proxy server of the first path.

In some embodiments, the estimated value of the first path and the second path may be compared to a predetermined list of value of device and/or operating systems. When the estimated value of the first path and the second path match the values of the device or operating systems in the predetermined list, the second network entity may be a proxy of the first path.

Figure 3:
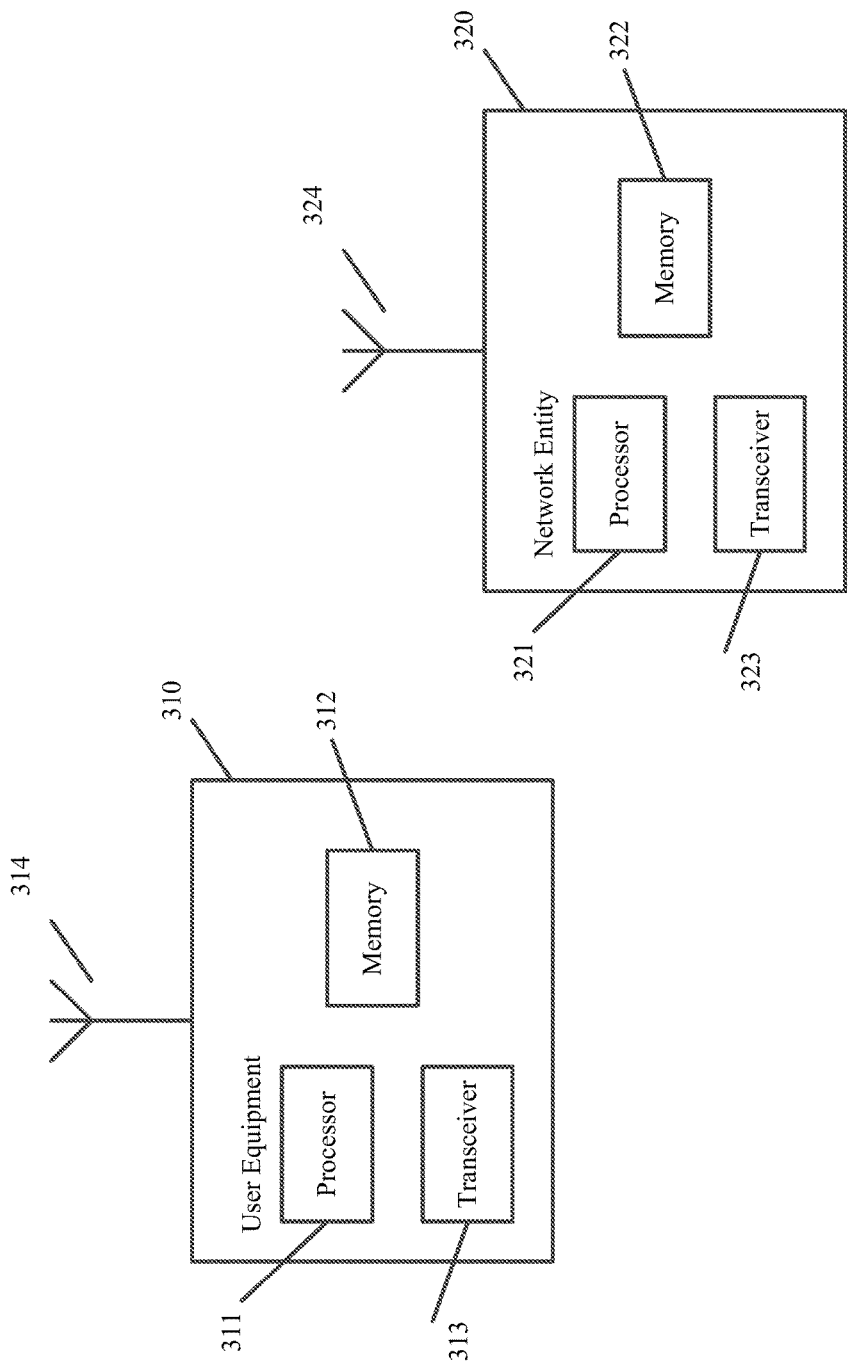
FIG. 3 illustrates a system according to certain embodiments.

FIG. 3 illustrates a system according to certain embodiments. It should be understood that each signal or block in FIGS. 1 and 2 may be implemented by various means or their combinations, such as hardware, software, firmware, one or more processors and/or circuitry. In one embodiment, a system may include several devices, such as, for example, network entity 320 or user equipment 310. The system may include more than one user equipment 310 and more one network entity 320, although only one access node shown for the purposes of illustration. The network entity may be a router, a proxy server, network node, a server, a host, a base station, or any of the other network node discussed herein. Network entity 320, which carries out the functions of any of the blocks in FIGS. 1 and 2, may be a third party server that is not located in the traced paths.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceiver 313 and 323 may be provided, and each device may also include an antenna, respectively illustrated as 314 and 324. Although only one antenna each is shown, many antennas and multiple antenna elements may be provided to each of the devices. Higher category user equipment generally include multiple antenna panels. Other configurations of these devices, for example, may be provided. For example, network entity 320 and user equipment 310 may be additionally or alternatively be configured for wired communication, in addition to wireless communication, and in such a case antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. In other embodiments, the user equipment or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 310 may be a mobile station (MS) such as a mobile phone or smart phone or multimedia device, a computer, such as a tablet, personal computer, or a laptop computer, provided with wireless communication capabilities. User equipment 310 may also be personal data or digital assistant (PDA) provided with wireless communication capabilities, portable media player, digital camera, pocket video camera, navigation unit provided with wireless communication capabilities or any combinations thereof.

In some embodiments, an apparatus, such as a network entity, such as a third party server that is not located on any of the traced paths, may include means for carrying out embodiments described above in relation to FIGS. 1 and 2. In certain embodiments, at least one memory including computer program code can be configured to, with the at least one processor, cause the apparatus at least to perform any of the processes described herein.

According to certain embodiments, an apparatus 320 may include at least one memory 322 including computer program code, and at least one processor 321. The at least one memory 322 and the computer program code are configured, with the at least one processor 321, to cause the apparatus 320 at least to detect a first path between a user equipment and a first network entity. The at least one memory 322 and the computer program code may also be configured, with the at least one processor 321, to also cause the apparatus 320 at least to detect a second path between the user equipment and a second network entity. The first path is longer than the second path. In addition, the at least one memory 322 and the computer program code are configured, with the at least one processor 321, to cause the apparatus 320 at least to determine whether the second network entity is a proxy server located between the user equipment and the first network entity based on an estimated value of the first path and an estimated value of the second path.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 320 or user equipment 310, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 3 illustrates a system including a network entity 320 and user equipment 310, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The user equipment 310 may likewise be provided with a variety of configurations for communication other than communication network entity 320. For example, the user equipment 310 may be configured for device-to-device or machine to machine communication.

As discussed above, certain embodiments can provide for a simple and efficient apparatus, method, or process for identifying and locating a proxy server. The proxy identity and location may be presented to a user as part of a multi-path graph, without any action being required on the part of the user. A user or a network operator may use the identification and location information of the proxy to fix a possible error or malfunction occurring at the proxy server.

The above embodiments may also use a low overhead, as it may simply establish a normal TCP connection to an endpoint. No destination port scanning or intensive testing may be required. The above embodiments can thus help to achieve significant improvements to the functioning of a network and/or to the functioning of the nodes or computers within the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Certain embodiments cover a wide range of proxies. While some embodiments described above may utilize TCP connection, any other protocol may be used, such as HTTP protocol for proxy header or a standard proxy port number. The communication systems discussed above may be implemented in any wireless communication network or cellular communication network, such as Third Generation Partnership (3GPP) technology, such as Long Term Evolution (LTE), LTE-advanced (LTE-A), $3^{rd}$ generation technology (3G), $4^{th}$ generation technology (4G), $5^{th}$ generation technology (5G), or any other IP Multimedia System (IMS).

Partial Glossary

WAN wide area network
TCP transmission control protocol
HTTPS hypertext transport protocol secure
HTTP hypertext transport protocol
TTL time-to-live
SYN synchronization
ICMP internet control message protocol

We claim:

1. A method comprising:
  detecting a first path between a user equipment and a first network entity;
  detecting a second path between the user equipment and a second network entity, wherein the first path is longer than the second path;
  determining whether the second network entity is a proxy server located between the user equipment and the first network entity based on an estimated value of the first path and an estimated value of the second path;
  identifying an error at the proxy server;
  estimating at least the value of the first path, wherein the value of the first path comprises an initial time-to-live value of a response packet from the first network entity, by adding the time-to-live value of the first network entity and a hop count value of the first network entity, and subtracting the added values by one; and
  estimating at least the value of the second path, wherein the value of the second path comprises an initial time-to-live value of a response packet from the second network entity, by adding a time-to-live value of the second network entity and a hop count value of the second network entity, and subtracting the added values by one,
  wherein when the estimated value of the first network entity is equal to the second value of the second network entity, the second network entity is not a proxy server of the first path, and
  wherein when the estimated value of the first network entity is not equal to the second value of the second network entity, the second network entity is a proxy server of the first path.

2. The method according to claim 1, wherein the estimated value of the first path and the estimated value of the second path are time-to-live values.

3. The method according to claim 1, wherein the first path and the second hop share at least one hop.

4. The method according to claim 1, wherein all of the hops of the second path are included in the first path.

5. The method according to claim 1, further comprising:
  comparing the estimated value of the first path and the estimated value of the second path to a predetermined list of values of devices or operating systems.

6. The method according to claim 5, wherein when the estimated value of the first path and the estimated value of the second path match to the values of device or operating systems in the predetermined list, the second network entity is the proxy server.

7. The method according to claim 1, wherein a traceroute probe is used to determine the first path and the second path.

8. The method according to claim 7, wherein connection-based probing or standard-based probing are used to determine at least the first path or the second path.

9. The method according to claim 8, wherein the connection-based probing is used to determine the second path and the standard-based probing is used to determine the first path.

10. The method according to claim 1, wherein when the second network entity is the proxy located in the first path, the second network entity does not let any probing packets through to the first entity.

11. The method according to claim 1, wherein the first entity and the second entity have the same IP address.

12. An apparatus, comprising:
  at least one memory comprising computer program code;
  at least one processor;
  wherein the at least one memory and the computer program code are configured, with the at least one processor, to cause the apparatus at least to:
  detect a first path between a user equipment and a first network entity;
  detect a second path between the user equipment and a second network entity, wherein the first path is longer than the second path; and
  determine whether the second network entity is a proxy server located between the user equipment and the first network entity based on an estimated value of the first path and an estimated value of the second path;
identify an error at the proxy server;
estimate at least the value of the first path, wherein the value of the first path comprises an initial time-to-live value of a response packet from the first network entity, by adding the time-to-live value of the first network entity and a hop count value of the first network entity, and subtracting the added values by one; and
estimate at least the value of the second path, wherein the value of the second path comprises an initial time-to-live value of a response packet from the second network entity, by adding the time-to-live value of the second network entity and a hop count value of the second network entity, and subtracting the added values by one,
wherein when the estimated value of the first network entity is not equal to the value of the second network entity, the second network entity is the proxy server, and
wherein when the estimated value of the first path and the estimated value of the second path match values of a device or operating systems in a predetermined list, the second network entity is the proxy server.

13. The apparatus according to claim 12, wherein the estimated value of the first path and the estimated value of the second path are time-to-live values.

14. The apparatus according to claim 12, wherein all of the hops of the second path are included in the first path.

15. The apparatus according to claim 12, wherein a traceroute probe is used to determine the first path and the second path.

16. The apparatus according to claim 12, wherein the first entity and the second entity have the same IP address.

17. A non-transitory computer-readable medium encoding instructions that, when executed in hardware, perform a process, the process comprising:
    detecting a first path between a user equipment and a first network entity;
    detecting a second path between the user equipment and a second network entity, wherein the first path is longer than the second path; and
    determining whether the second network entity is a proxy server located between the user equipment and the first network entity based on an estimated value of the first path and an estimated value of the second path;
    identifying an error at the proxy server;
    estimating at least the value of the first path, wherein the value of the first path comprises an initial time-to-live value of a response packet from the first network entity, by adding the time-to-live value of the first network entity and a hop count value of the first network entity, and subtracting the added values by one; and
    estimating at least the value of the second path, wherein the value of the second path comprises an initial time-to-live value of a response packet from the second network entity, by adding a time-to-live value of the second network entity and a hop count value of the second network entity, and subtracting the added values by one,
    wherein when the estimated value of the first network entity is equal to the second value of the second network entity, the second network entity is not a proxy server of the first path, and
    wherein when the estimated value of the first network entity is not equal to the second value of the second network entity, the second network entity is a proxy server of the first path.

* * * * *